United States Patent [19]
Arbel

[11] Patent Number: 5,982,935
[45] Date of Patent: Nov. 9, 1999

[54] METHOD AND APPARATUS FOR COMPUTING MPEG VIDEO RECONSTRUCTED DCT COEFFICIENTS

[75] Inventor: Ygal Arbel, Belmont, Calif.

[73] Assignee: National Semiconductor Corporation, Santa Clara, Calif.

[21] Appl. No.: 08/834,059

[22] Filed: Apr. 11, 1997

[51] Int. Cl.⁶ .............. G06K 9/36; G06K 9/46; H04N 1/415
[52] U.S. Cl. .............. 382/233; 382/250; 358/433
[58] Field of Search ................. 382/250, 251, 382/232, 233, 246, 248; 386/109, 111

[56] References Cited

U.S. PATENT DOCUMENTS

5,768,429  6/1998  Jabbi et al. .............. 382/233
5,778,143  7/1998  Boyce .............. 386/111

*Primary Examiner*—Joseph Mancuso
*Assistant Examiner*—Derrick Fields
*Attorney, Agent, or Firm*—Steven F. Caserza; Flehr Hohbach Test Albritton & Herbert

[57] ABSTRACT

A novel apparatus and method is disclosed to perform discrete cosine transform (DCT) coefficient reconstruction more efficiently and using less hardware resources than prior art techniques. The invention comprises a correction factor generator apparatus which computes a correction factor which is used in the DCT coefficient reconstruction process. Use of the correction factor enables DCT coefficient reconstruction to be performed using lesser computations and lesser hardware resources than prior art techniques. The apparatus and method can be used to perform DCT coefficient reconstruction for both MPEG-1 and MPEG-2 encoded video data streams.

7 Claims, 6 Drawing Sheets

FIG. 8

METHOD AND APPARATUS FOR COMPUTING MPEG VIDEO RECONSTRUCTED DCT COEFFICIENTS

TECHNICAL FIELD

This invention pertains to storage and retrieval of digital video information encoded according to the MPEG standard, and more specifically to a novel apparatus and method for computing video reconstructed discrete cosine transform coefficients in a highly efficient manner.

BACKGROUND

The CCITT/ISO committee has standardized a set of compression and decompression algorithms for still and motion digital video. These standards include the JPEG, MPEG and H.261 compression schemes. These standards are commonly applied in video conferencing, CD-ROM based interactive videos for education and entertainment, video or informational kiosks, video on demand (VOD) applications and many other applications which require communication of motion digital video. These standards utilize transform code compressed domain formats, which include the Discrete Cosine transform (DCT), and the interframe predictive code format. Motion Compensation (MC) algorithms are used in conjunction with the DCT format and other hybrid compressed formats.

The MPEG standard was drafted by the Moving Picture Coding Experts Group (MPEG) which operates within the framework of the Joint ISO/IEC Technical Committee (JCCI) on Information Technology. The draft provided a standard for coded representation of moving pictures, audio and their combination. The MPEG standard is intended for equipment supporting continuous transfer rate of up to 1.5 Mbits per second, such as compact disks, digital audio tapes, or magnetic hard disks.

Figure 1:
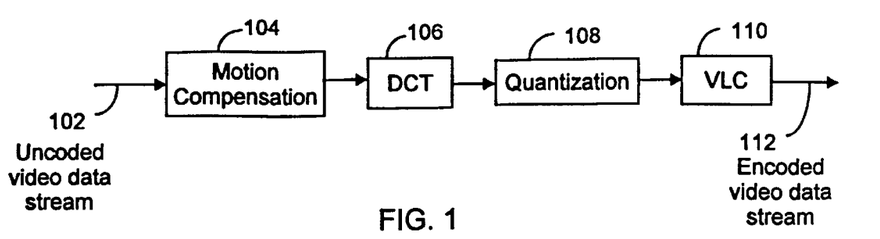
FIG. 1 is a block diagram depicting the steps involved in encoding a MPEG video data stream.

FIG. 1 depicts the steps involved in the MPEG encoding process. As shown in FIG. 1, video data stream 102 is first subjected to motion compensation, represented by block 104, which removes the interframe redundancy from the color motion picture frames. Discrete cosine transformation (DCT), represented by block 106, is then performed on each of the frames to map the spatial luminance or chrominance values into the frequency domain. Next, quantization, represented by block 108, is performed on each 8-by-8 DCT coefficient block (explained below) in accordance with its chrominance or luminance type and its frequency content. This eliminates DCT coefficients below a set threshold. Finally, variable length encoding (VLC), represented by block 110, is performed to compress the video data stream using variable length coding and output encoded video data stream 112.

The 1-dimensional DCT is similar to a 1-dimensional Fourier transform. It transforms a 1-dimensional signal from its original domain—typically time or space domain-to a frequency domain for a time signal or a spatial-frequency domain for a space signal. The transform used in MPEG-1 and MPEG-2 standards, represented by block 106, is a 2-dimensional DCT. A 2-dimensional picture element measuring 8 pixels by 8 pixels is called a block. Performing DCT on an 8-by-8 picture block produces an 8-by-8 DCT coefficients block. It has been shown that due to typical picture statistics, better compression is achieved in the spatial frequency domain than in the spatial domain. The DCT step represented by block 106 does not perform any compression as both the input and the output consists of sixty four pixels. The compression is achieved by the subsequent quantization and variable length coding steps represented by blocks 108 and 110 respectively.

Figure 2:
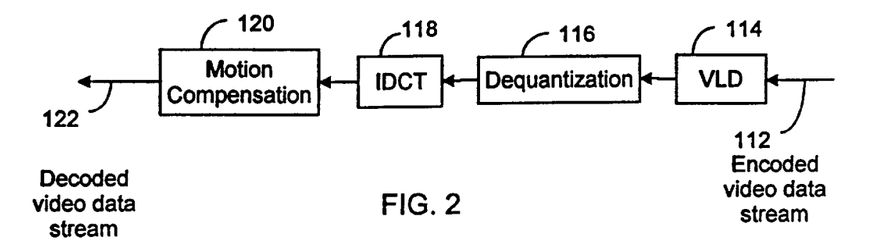
FIG. 2 is a block diagram depicting the steps involved in decoding an encoded MPEG video data stream.

FIG. 2 depicts the steps involved in the MPEG decoding process. Essentially, for MPEG decoding the steps involved in MPEG video encoding are reversed. Thus, video decoding involves variable length entropy decoding (VLD), represented by block 114, followed by dequantization, represented by block 116, followed inverse discrete cosine transformation (IDCT), represented by block 118, and finally motion compensation, represented by block 120. The variable length entropy decoding (VLD) step parses the encoded video stream into symbols using variable length decoding. Dequantization scales the quantized DCT coefficients. The dequantized video data stream is then subjected to inverse discrete cosine transformation. Finally, motion compensation is performed on the video data stream before it is forwarded to a rendering device for display. The output of the MPEG video decode process is decoded video data stream 122 which is then displayed using a video rendering device such as a TV or a RGB monitor.

Figure 3:
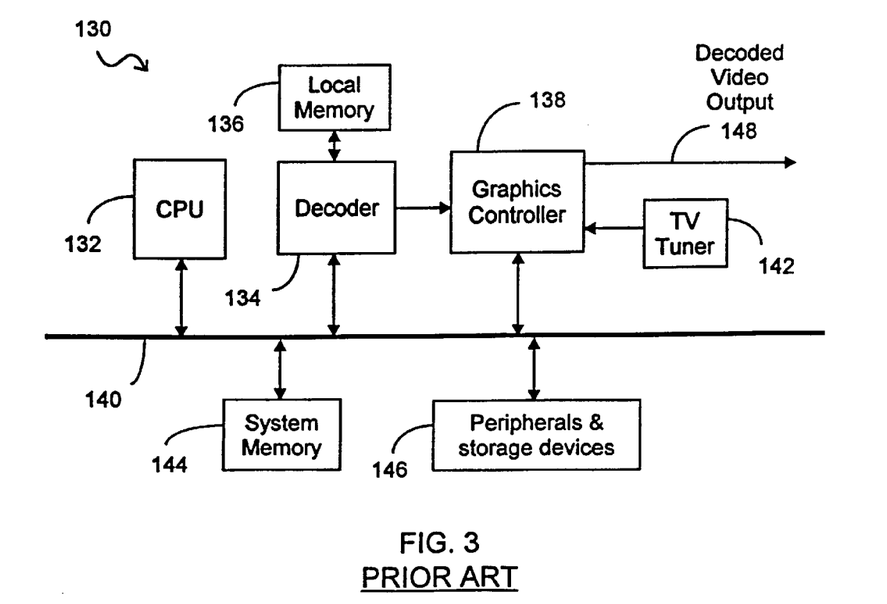
FIG. 3 depicts a prior art computer system for decoding encoded MPEG video data streams.

FIG. 3 depicts a typical computer system 130 used to perform MPEG video decoding. As depicted in FIG. 3, computer system 130 comprises CPU 132, decoder 134 coupled to its local memory 136, graphics controller 138, system memory 144, various peripheral and storage devices 146 and bus interface 140. Bus interface 140 is generally a high speed bus interface such as a PCI or AGP bus interface and provides communication means between CPU 132, decoder 134, graphics controller 138, system memory 144 and storage devices 146. Peripheral and storage devices 146 include hard disks, CD drives or DVDs and other similar commercially available multimedia storage devices. Graphics controller 138 is coupled to tuner 142 and provides 2-D and 3-D graphics functionality as well as video scaling and color space conversion. The output from graphics controller 138 is decoded video data stream 148 when can then be relayed to a video rendering device such as a TV or a RGB monitor for display. MPEG video decode tasks depicted in FIG. 2 are performed either by software executed by CPU 132 or by decoder 134 hardware. In sophisticated computer systems, video decode tasks can also be split between CPU 132 and decoder 134.

Appendix A recites an algorithm used to perform the dequantization step depicted by block 116 in FIG. 2. This algorithm performs DCT coefficients reconstruction as described in the ISO 11172-2 (MPEG-1 Video) Specification. The algorithm consists of operations which are performed on each pixel of an 8-by-8 DCT block. Four 8-by-8 DCT blocks constitute to form a 16-by-16 macroblock which is the smallest encode/decode unit utilized in the MPEG standard. Thus, The DCT coefficients for each block present in the macroblock can be dequantized by steps equivalent to those recited in Appendix A. The algorithm stated in Appendix A broken down into five logical sequential steps as depicted in the flow chart shown in FIG. 4. Assuming that the numerical values are represented as fixed-point, two's complement binary numbers, each step of the algorithm is described below.

Figure 4:
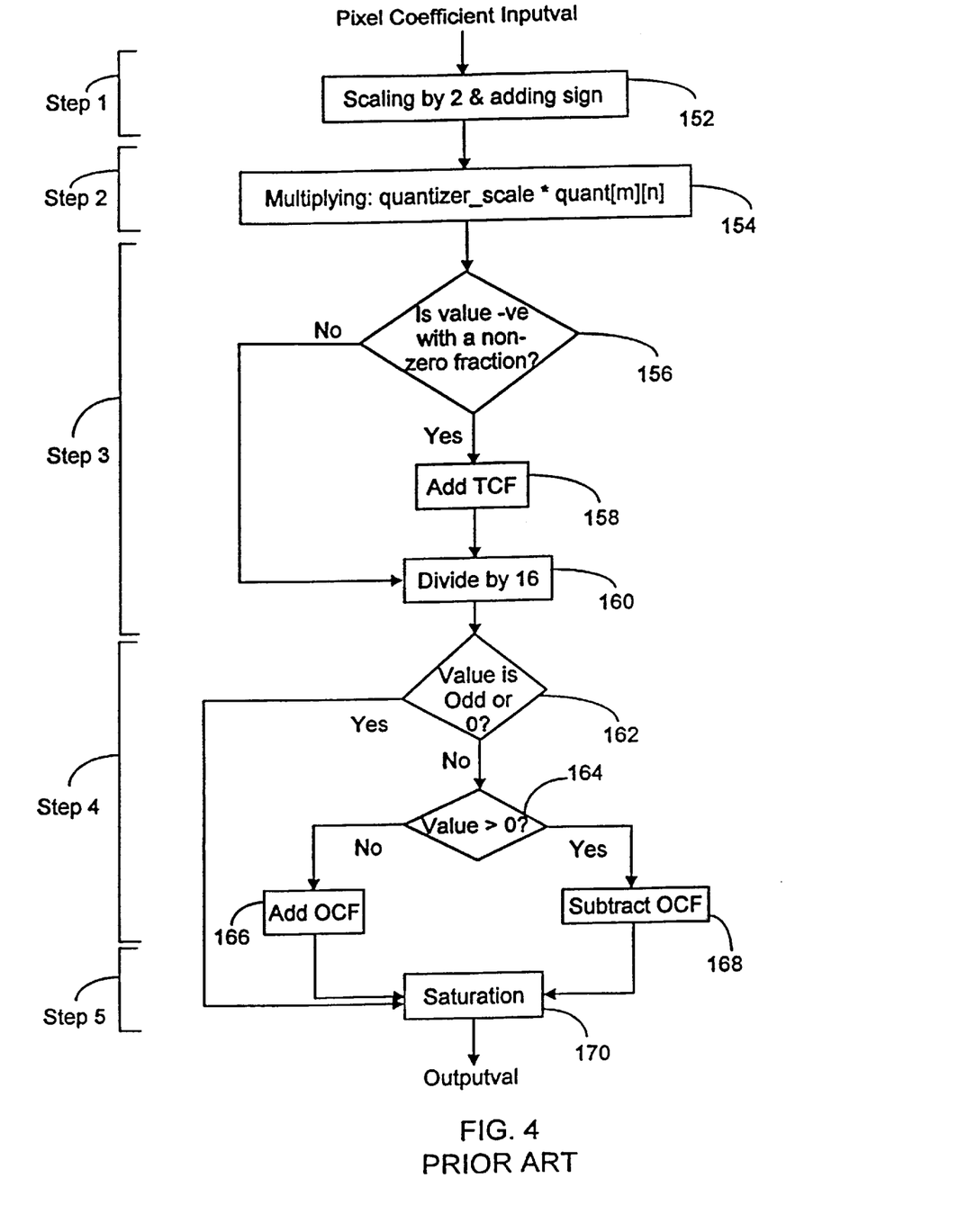
FIG. 4 is a flow chart delineating the steps involved in the video DCT reconstruction algorithm described in Appendix A.

Step 1 (Lines 6–7)
Line 6a: dct_recon[m][n]=(((2* dct_zz[i])+Sign(dct_zz[i]))
Line 7a: * quantizer_scale * quant[m][n])/16;
Line 6b: dct_recon[m][n]=(((2* dct_zz[i])
Line 7b: * quantizer_scale * quant[m][n])/16;

As shown by block 152 of FIG. 4, in this step each pixel coefficient, which could be part of a non-intracoded block (6a–7a) or an intra-coded block (6b–7b), is scaled by a factor of two. For non-intracoded blocks, (Sign( )) is added to it. The Sign( ) function is defined as follows:

$$\text{Sign}(x) = 1, \text{ for } (x > 0)$$
$$= 0, \text{ for } (x = 0)$$
$$= -1, \text{ for } (x < 0) \quad \text{(Appendix A: Line 6)}$$

Thus, this step involves one multiplication and one addition/subtraction arithmetic operation.

Step 2: (Line 7)

As shown by block 154 in FIG. 4, in this step the pixel coefficients are multiplied by a global scaling factor "quantizer_scale" and by a quantization matrix entry "quant [m][n]". "Quantizer_scale" is a global quantization scaler for the entire 8-by-8 block. "quant[m][n]" is a 2-dimensional 8-by-8 quantization matrix (for non-intracoded block or intracoded block) with individual scaling factors for each coefficient. Thus, this step involves one multiplication arithmetic operation.

Step 3: (Line 7)

This step involves dividing the pixel coefficients by 16 with truncation towards zero. This is represented by block 156, 158 and 160 in FIG. 4. First, represented by block 156, a determination is made to ascertain whether the input value of the pixel coefficient is negative with a non-zero fraction. If so, the value is truncated towards zero by first adding the "truncation correction factor" (TCF) having value 15 to it, represented by block 158, and then dividing the result by 16, represented by block 160. If on the other hand the value is positive, or negative with no fractional part, a simple division by 16, represented by block 160 is performed. Thus, this step involves one comparison, one addition and one division arithmetic operation.

Step 4: Lines 8–9

```
Line  if ((dct_recon[m][n] & 1) == 0)   //Oddification step
8:
Line      dct_recon[m][n] = dct_recon[m][n] - Sign(dct_recon[m][n]);
9:
```

This step involves performing oddification towards 0 as represented by blocks 162, 164, 166 and 168 in FIG. 4. First, represented by block 162 it is determined whether the resultant pixel coefficient value after Step 3 is odd or zero. If the value is odd or zero, the algorithm proceeds to block 170. However, if the value is even and non-zero, the value is further tested, represented by block 164, for being greater than 0. If the value is positive, then a "oddification correction factor" (OCF) which has a value of 1 is subtracted from the coefficient value, represented by block 168. If value is negative and non-zero, the OCF is added to the coefficient value, as represented by block 166. All odd and zero values remain unchanged. Thus, this step involves one addition or subtraction arithmetic operation.

Step 5: Lines 10–15

```
Line 10:      if (dct_recon[m][n] > 2047)
Line 11:          dct_recon[m][n] = 2047;
Line 12:      if (dct_recon[m][n] < -2048)
Line 13:          dct_recon[m][n] = -2048;
Line 14:      if (dct_zz[i] == 0)
Line 15:          dct_recon[m][n] = 0;
```

The final step of the algorithm involves the process of saturation which imposes a limiter on the value of the coefficient. It does not allow the coefficient value to be larger than 2047 or smaller than −2048, thus effectively limiting the coefficient to be a 12-bit, two's-complement signed number. In lines 10–11, saturation is performed on the positive value limit, while in lines 12–13, saturation is performed on the negative value limit. Lines 14–15 ensure that if the input value is zero, the output value is also zero. Thus, this step involves three comparisons and no arithmetic operations.

Figure 5:
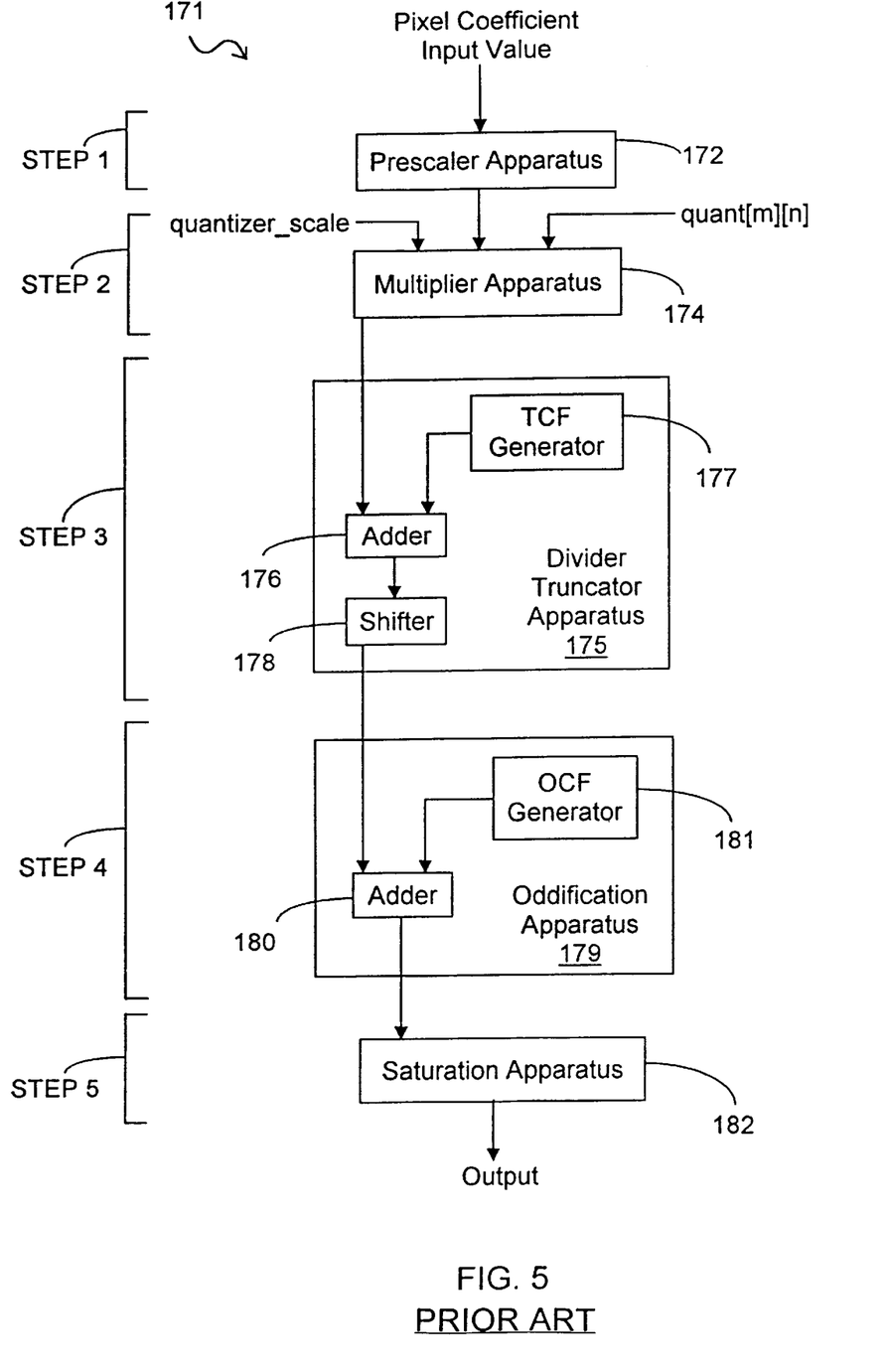
FIG. 5 is a block diagram depicting a prior art decoder apparatus to perform DCT coefficient reconstruction according to the algorithm described in Appendix A.

FIG. 5 depicts a prior art decoder apparatus 171 for implementing the steps described in Appendix A. As shown in FIG. 5, decoder apparatus 171 comprises of prescaler apparatus 172, multiplier apparatus 174, divider/truncator apparatus 175, oddification apparatus 179 and saturation apparatus 182. Pre-scaler 172 performs operations corresponding to Step 1, which are scaling by a factor of 2 and adding the sign. Next, multiplier apparatus 174 receives three inputs-output from Step 1, the "quantizer_scale" and the "quant[m][n]" and multiplies the three inputs (corresponding to Step 2). Divider/truncator apparatus 175 is responsible for performing operations corresponding to Step 3 and comprises of adder 176, shifter 178 and truncation correction factor (TCF) generator 177. TCF generator 177 generates the appropriate truncation correction factor which is then fed to adder 176 which adds the truncation correction factor to the result from the previous Step 2. The truncation correction factor has a value of 15 if the coefficient is negative with a non-zero fraction, and a zero value otherwise. Shifter 178 performs the division by 16 by performing a 4-bit right arithmetic shift (corresponding to block 160 in FIG. 4). The result from shifter 178 is then fed to oddification apparatus 179 which performs operations corresponding to Step 4. Oddification apparatus 179 comprises oddification correction factor (OCF) generator 181 and adder 180. Oddification correction factor (OCF) generator 181 generates the appropriate oddification correction factor which is then fed to adder 180 which adds or subtracts the oddification correction factor from the result of previous step 3. Finally, saturation apparatus 182 receives the resultant pixel coefficient from Step 4 and performs saturation operations corresponding to Step 5. Saturation apparatus 182 imposes a limiter on the coefficient value and can be a simple hardware selector or demultiplexer. The block output is one of three values, +2047 if input value is greater than 2047, −2048 if input value is less than −2048, and equal to the input value in all other cases.

As mentioned earlier, DCT coefficient reconstruction is an integral part of the MPEG video decode process and is performed on every pixel of each block of the video data stream. Thus, the amount of time and compute resources required to decode the entire MPEG encoded video stream is directly proportional to the time and resources required for each step of the reconstruction algorithm. In order to increase the efficiency of the video decode process, it is desirable to accomplish the decode process using a reduced number of computations, translating to savings in time required for video decode. It is also desirable to reduce the complexity of the decoder so that it is cheaper and occupies less hardware real estate—thus reducing the cost of the video decoder and the overall video decode process.

SUMMARY

In accordance with the teachings of this invention, a novel apparatus and method is taught which performs DCT coefficient reconstruction more efficiently and using lesser hardware resources than prior art techniques. The increased efficiency and reduction in hardware complexity translates to savings in time, computing resources and decoding costs.

The increased efficiency is achieved by replacing the division/truncation step (Step 3) and the oddification step (Step 4) of prior art techniques, with a new and novel "innovative step." In accordance with the teachings of the current invention, the innovative step includes generating a "generic correction factor" which replaces the truncation and oddification correction factors of prior art techniques. The generic correction factor is then used to perform DCT coefficient reconstruction using lesser arithmetic operations and simpler decoder hardware than the prior art techniques.

In particular, in accordance with the present invention, the innovative step requires one less arithmetic operation (addition/subtraction) than prior art techniques to achieve DCT coefficient reconstruction. The elimination of one arithmetic operation translates to a simpler hardware implementation of the invention. The amount of logic required to compute the generic correction factor is simpler than the logic required to compute the truncation and oddification correction factors. Thus, the present invention presents net savings in hardware real estate and hardware costs, as well as improved performance and a more streamlined architecture to achieve MPEG video decode.

BRIEF DESCRIPTION OF THE DRAWINGS

Additional features of the invention will be readily apparent from the following detailed description and appended claims when taken in conjunction with the drawings, in which:

DETAILED DESCRIPTION OF EXEMPLARY EMBODIMENTS

Figure 6:
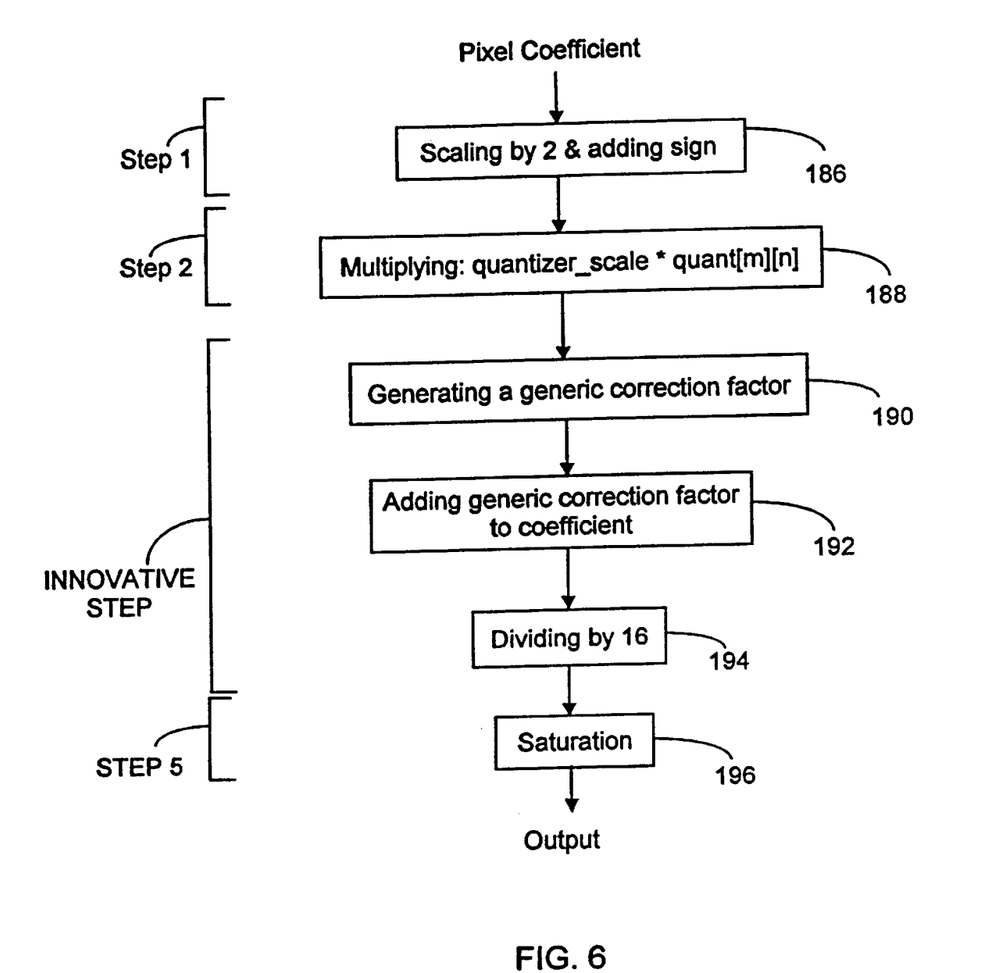
FIG. 6 is a flow chart depicting an embodiment of the DCT coefficient reconstruction algorithm in accordance with the teachings of the present invention.

FIG. 6 depicts a flow chart showing the steps required to perform DCT coefficient reconstruction in accordance with the teachings of the current invention.
Step 1
This step, represented by block 186, is similar to Step 1 of prior art techniques shown in FIG. 4 (block 152). In this step each pixel coefficient, which could be part of a non-intracoded block or an intracoded block, is scaled by a factor of two. If the pixel is part of a non-intracoded block, then the sign (Sign( )) is added to it. The Sign( ) function is defined as follows:

$$\text{Sign}(x) = 1, \text{ for } (x > 0)$$
$$= 0, \text{ for } (x = 0)$$
$$= -1 \text{ for } (x < 0) \text{ (Appendix A: Line 6)}$$

Thus, this step involves one multiplication and one addition or subtraction arithmetic operation.
Step 2
This step, represented by block 188, is similar to Step 2 of prior art techniques shown in FIG. 4 (block 154). In this step the pixel coefficients are multiplied by a global scaling factor "quantizer_scale" and by a quantization matrix entry "quant[m][n]". "Quantizer_scale" is a global quantization scaler for the entire 8-by-8 block. "quant[m][n]" is a 2-dimensional 8-by-8 quantization matrix (for non-intracoded block or intracoded block) with individual scaling factors for each coefficient. Thus, this step involves one multiplication arithmetic operation.
Innovative Step
In accordance with the teachings of the current invention, the innovative step comprising of blocks 190, 192 and 194, replaces steps 3 and 4 of the prior art technique. Appendix B describes an algorithm for an embodiment of the innovative step. As shown in Appendix B (lines 1 through 30) and depicted by block 190 in FIG. 6, the first step involves computing a generic correction factor based on the value of the pixel coefficient from Step 2. As is evident, the operations involved in the computation of the generic correction factor (Appendix B, lines 1–30) consist entirely of bitwise comparisons which require substantially less time than arithmetic operations like addition, subtraction, multiplication, and division. Furthermore, the computational logic required to compute the generic correction factor is simpler than that required to compute the truncation and oddification correction factors. The generated generic correction factor is then added to the pixel coefficient value as depicted by block 192 in FIG. 6 and line 31 in Appendix B. Integer division by 16 is then performed on the sum, as shown by block 194.

The innovative step achieves the same effect as Steps 3 (dividing by 16 with truncation towards zero) and 4 (oddification towards zero) of prior art techniques. Appendix C lists a sample 'C' language program which exhaustively compares results obtained from prior art computation steps 3 and 4 and results obtained from using the innovative step. The output of the sample 'C' program is listed in Appendix D. In Appendix D, the "input" value refers to the input pixel coefficient value which acts as input to the innovative step and Step 3 of prior art techniques. The "innovation" value refers to the resultant value of DCT coefficient reconstruction using the innovative step in accordance with the teachings of the current invention. The "reference" value refers to the resultant value obtained using prior art computational steps 3 and 4. A comparison of the "innovation" value and the corresponding "reference" value shows that the results obtained using prior art techniques and those obtained employing the innovative step are identical. Thus, the innovative step achieves the same results as prior art techniques.

Furthermore, the innovative step requires a lesser number of arithmetic operations than those required for steps 3 and 4 of the prior art. As described earlier, steps 3 and 4 of the prior art require a total of three arithmetic operations, namely, one addition to add the truncation correction factor, one division by 16, and another addition/subtraction of the oddification correction factor. However, the innovative step taught by an embodiment of the current invention requires only two arithmetic operations, namely, one addition of the generic correction factor and one division by 16. Thus, the current invention requires one less arithmetic operation than prior art techniques to achieve DCT coefficient reconstruction.

Step 5

The final step, represented by block 196, involves the process of saturation and is similar to the saturation step (Step 5) of prior art techniques depicted in FIG. 4 (block 170). As described earlier, saturation imposes a limiter on the value of the coefficient. It does not allow the coefficient value to be larger than 2047 or smaller than −2048, thus effectively limiting the coefficient to be a 12-bit, two's-complement signed number. In lines 10–11, saturation is performed on the positive value limit, while in lines 12–13, saturation is performed on the negative value limit. Lines 14–15 ensure that if the input value is zero, the output value is also zero. Thus, this step involves three comparisons and no arithmetic operations.

Figure 7:
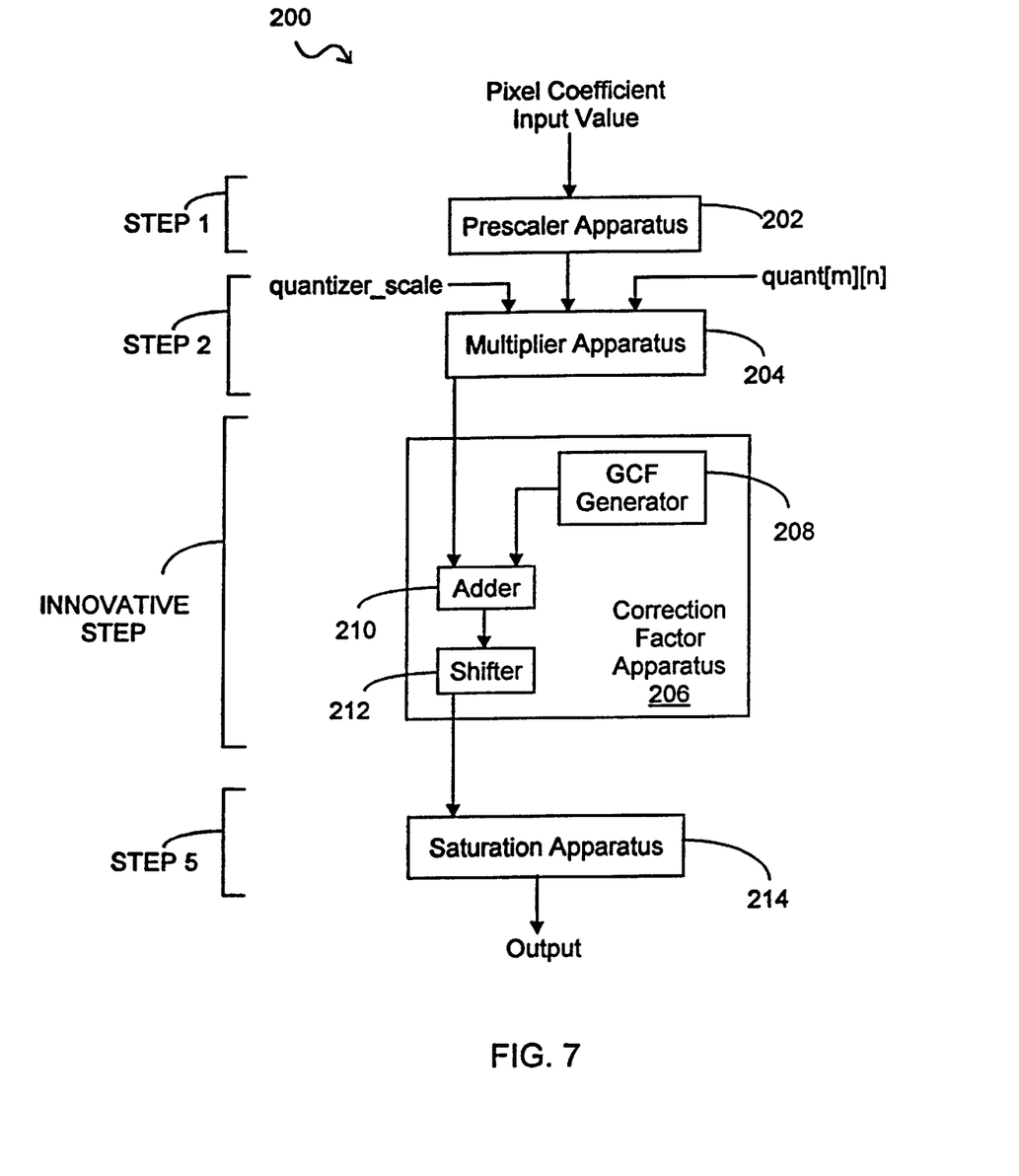
FIG. 7 is a block diagram depicting a decoder apparatus in accordance with the teachings of the present invention.

FIG. 7 depicts an embodiment of decoder apparatus 200 in accordance with the teachings of the present invention. As shown in FIG. 7, decoder apparatus 200 comprises prescaler apparatus 202, multiplier apparatus 204, correction factor apparatus 206 and saturation apparatus 214. Prescaler apparatus 202, multiplier apparatus 204 and saturation apparatus 214 are architecturally and functionally similar to their counterparts depicted in FIG. 5 (blocks 172, 174 and 182). However, in accordance with the teachings of the current invention, divider/truncator apparatus (FIG. 5, block 175) and oddification apparatus (FIG. 5, block 179) are replaced by innovative correction factor apparatus 206 which performs operations corresponding to the innovative step.

In the embodiment depicted in FIG. 7, correction factor apparatus 206 comprises a generic correction factor (GCF) generator 208, adder 210 and shifter 212. GCF generator 208 computes the generic correction factor according to the algorithm stated in Appendix B (lines 1–30). The generic correction factor computed by GCF generator 208 is then fed to adder 210 which adds the correction factor to the coefficient value from previous step 2. Shifter 212 then performs the division by 16 operation by performing a 4-bit right shift operation. The resultant coefficient value is then forwarded to saturation apparatus 214.

As is evident from FIG. 7, correction factor apparatus 206 requires less hardware than that required for divider/truncator apparatus 175 and oddification apparatus 179. In particular, correction factor apparatus 206 requires only one correction factor generator as opposed to two generators required for truncation and oddification correction factor generation. Furthermore, the computational logic required to compute the generic correction factor is simpler than that required to compute the truncation and oddification correction factors. Consequently, the hardware design of GCF generator 208 is simpler than the combined hardware design of divider/truncator apparatus 175 and oddification apparatus 179. Additionally, since the innovative step performs only one arithmetic operation, decoder apparatus 200 requires one less adder than prior art apparatus 171 depicted in FIG. 5. Thus, decoder apparatus 200 requires lesser hardware resources than prior art techniques.

Advantages of the Current Invention

As mentioned earlier, DCT coefficient reconstruction is an integral part of the MPEG video decode process and is performed on each pixel of each block of the MPEG video data stream. Thus, the amount of time and compute resources required to decode the entire MPEG encoded video stream is directly proportional to the time and resources required for each step of the reconstruction algorithm. The current invention performs DCT coefficient reconstruction more efficiently than prior art techniques by requiring fewer arithmetic computations than prior art techniques. In particular, the current invention can process each pixel faster than prior art techniques. This translates to significant savings in the total time required for MPEG video decode of the entire video data stream.

Furthermore, the current invention requires less hardware resources than prior art decoders. The net savings in hardware resources and hardware real estate translate to significant cost reduction for the MPEG decode process. Additionally, the decoder hardware in accordance with the teachings of the current invention is simpler in design than prior art decoders. Reduction in complexity of the decoder translates to further savings in cost. Thus, the streamlined architecture of the present invention results in significant savings in hardware resources and improved performance of the MPEG decode process.

Alternate Embodiments

As mentioned earlier, the task of video decoding is performed either through software executed by CPU 132 (FIG. 3) or by decoder 134 or split between CPU 132 and decoder 134. The embodiment of the current invention depicted in FIG. 7 describes a hardware implementation of the current invention. However, as mentioned earlier, video decode tasks can also be performed by software executing on a CPU. Furthermore, video decode tasks can also be distributed between tasks executed by software running on the CPU and tasks performed by decoder hardware. Thus, in alternate embodiments of the current invention, DCT coefficient reconstruction can be performed by software executing on a CPU or can be split between software running on the CPU and tasks performed by decoder hardware. In these alternate embodiments of the present invention, the steps executed by software reside as software modules in system memory. DCT coefficient reconstruction is performed by the CPU accessing system memory via a bus interface and executing the software modules. Thus, in these alternate embodiments, all or a subset of DCT coefficient reconstruction tasks are performed by software executed by the CPU.

Figure 8:
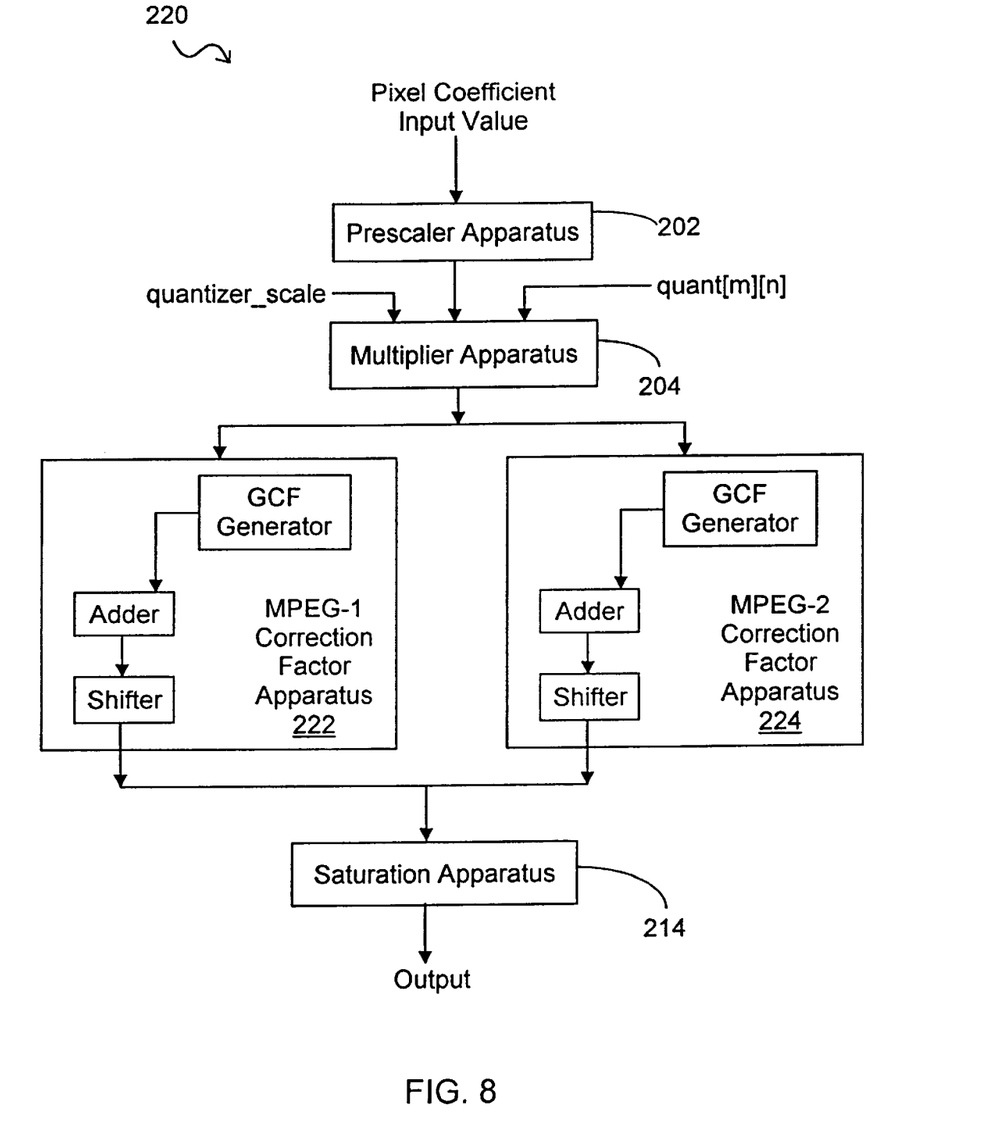
FIG. 8 is a block diagram depicting an decoder apparatus embodiment of the present invention supporting both MPEG-1 and MPEG-2 encoded video data streams.

The current invention can be used to decode both MPEG-1 and MPEG-2 video streams. However, since there is no "oddification" step (Step 3 depicted in FIG. 4) in MPEG-2, a different generic correction factor is required for MPEG-2 video decode. FIG. 8 depicts an embodiment of the current invention capable of decoding MPEG-1 and MPEG-2 video data streams. As depicted in FIG. 8, decoder apparatus 220 is modified to include two separate correction factor apparatuses: MPEG-1 correction factor apparatus 222 which computes an appropriate generic correction factor for MPEG-1 video data streams and MPEG-2 correction factor apparatus 224 which computes an appropriate generic correction factor for MPEG-2 video data streams. Decoder apparatus 220 can thus support both MPEG-1 and MPEG-2 video data streams.

The invention now being fully described, it will be apparent to one of ordinary skill in the art that many changes and modifications can be made thereto without departing from the spirit or scope of the appended claims.

All publications and patent applications mentioned in this specification are herein incorporated by reference to the same extent as if each individual publication or patent application was specifically and individually indicated to be incorporated by reference.

APPENDIX A

```
//Description of variables used in the algorithm
m           Row index within the 8-by-8 block
n           Column index within the 8-by-8 block
i           Zigzag index of the currently treated DCT coefficient
scan[m][n]         Lookup table converting a 2-dimensional coordinate to a 1-
                   dimensional zigzag index
dct_recon[m][n]    The currently treated DCT reconstructed coefficient
dct_zz[i]          The zigzag-ordered DCT coefficients derived after the VLD
                   process
Sign()             The sign function as described below:
                   Sign(x)    = 1, for x > 0
                              = 0, for x = 0
                              = -1, for x < 0
quantizer_scale    a global quantization scaler for the entire 8-by-8 block
quant[m][n]        A 2-dimensional 8-by-8 quantization matrix with individual
                   scaling factors for each coefficient. This could be for a non-
                   intracoded block or a intra-coded block.
ALGORITHM:

//Start a 2-dimensional loop covering an 8-by-8 coefficient block
1: for (m = 0; m < 8; m++)
2: {
3:    for (n=0; n < 8; n++)
4:    {
          //Calculate the index for the current coefficient in the 1-dimensional
          //zigzag format, which is the output format of the VLD process.
5:        i = scan[m][n];
          // If quantization matrix "quant" is for a non-intracoded block
6a:       dct_recon[m][n]= (((2* dct_zz[i]) + Sign(dct_zz[i]))
7a:                              * quantizer_scale * quant[m][n]) / 16;
          // If quantization matrix "quant" is for an intracoded block
6b:       dct_recon[m][n]= (2* dct_zz[i])
7b:                              * quantizer_scale * quant[m][n]) / 16;
8:        if ((dct_recon[m][n] & 1) == 0)   //Oddification towards zero
9:              dct_recon[m][n] = dct_recon[m][n] - Sign(dct_recon[m][n]);
          // Perform saturation on the positive value limit
10:       if (dct_recon[m][n] > 2047)
11:             dct_recon[m][n] = 2047;
          // Perform saturation on the negative value limit.
12:       if (dct_recon[m][n] < -2048)
13:             dct_recon[m][n] = -2048;
          // Ensure that if the input value is zero, the output value is also zero.
14:       if (dct_zz[i] == 0)
15:             dct_recon[m][n] = 0
16: }
17:} // End the 2-dimensional loop.
```

APPENDIX B

```
"inval"       - The input value to the innovative step (Refer to FIG. 6, block 186--left
                input.
"corr_fact"   - The generic correction factor used in the innovative step.
"outval"      - The output value of the innovative step.
Computation of the generic correction factor is described below (using 'C' language
code):
// First compute four boolean flags:
//   (1) m_z    - indicates zero or small negative inval
//   (2) m_sn   - indicates a small negative inval
//   (3) m_n    - indicates a negative inval
//   (4) m_e    - indicates an even inval
1: if ((inval & 0xfffffff0) == 0)
2:    mz_z = 1;           // zero or small negative
3: else
4:    m_z = 0;
5: if (((inval & 0xfffffff0) == 0xfffffff0) && ((inval & 0xf) != 0))
6:    m_sn = 1;           // small negative
7: else
8:    m_sn = 0;
9: if (inval < 0)
10:   m_n = 1;
11: else
12:   m_n = 0;
13: if(     ((inval > 0) && ((inval & 0x10)) == 0))
14:      || ((inval < 0) && ((inval & 0x10) == 0) && ((inval & 0xf) == 0))
15:      || ((inval < 0) && ((inval & 0x10) != 0) && ((inval & 0xf) != 0)) )
16:   m_e = 1;            //even
```

APPENDIX B-continued

```
17: else
18:   m_e = 0;
// Now use the four boolean flags to compute the correction factor
19: if(m_z)
20:   corr_fact = 0
21: else if (m_sn)
22:   corr_fact = 15;
23: else if ((m_e) && (!m_n))
24:   corr_fact = -16;
25: else if ((m_e) && (m_n))
26:   corr_fact = 31
27: else if ((!m_e) && (m_n))
28:   corr_fact = 15;
29: else
30:   corr_fact = 0;
// Given the correction factor, the output of the computation process is:
31: outval = (inval + corr_fact) >> 4;       //Add correction factor to value and integer
                                             // divide by 16
```

APPENDIX C

EXHAUSTIVE VERIFICATION PROGRAM

```
/* *******************************************************
This C program performs exhaustive comparison between prior art computation steps
3 and 4, and the innovative step (combines steps 3 and 4 of the prior art) of the
present invention.
******************************************************* */
#include <stdio.h>
#include <string.h>
#include <math.h>
/* ---------------------------- */
int saturate (int x) {
    if (x > 2047) return 2047;
    if (x <- 2048) return -2048;
    return x;
}
/* ---------------------------- */
int get_correction_factor(int inval) {
    int corr_fact;
    int m_z, m_sn, m_n, m_e;
    if((inval & 0xfffffff0) == 0) m_z = 1;
    else m_z = 0;
    if (((inval & 0xfffffff0) == 0xfffffff0) && ((inval & 0xf) != 0) )
        m_sn = 1;
    else m_sn = 0
    if(inval < 0) m_n = 1;
    else m_n = 0;
    if ( ((inval > 0) && ((inval & 0x10) == 0))
        || ((inval < 0) && ((inval & 0x10) == 0) && ((inval & 0xf) == 0))
        || ((inval < 0) && ((inval & 0x10) != 0) && ((inval & 0xf) != 0)) )
        m_e = 1;
    else m_e = 0;
    if (m_z)                              corr_fact = 0;
    else if (m_sn)                        corr_fact = 15;
    else if ((m_e) && (!m_n))             corr_fact = -16;
    else if ((m_e) && (m_n))              corr_fact = 31;
    else if ((!m_e) && (m_n))             corr_fact = 15;
    else                                  corr_fact = 0;
    return corr_fact;
}
/* -------------------------------- */
main (int argc, char* argv[]) {
    int t, ref, innov;
    int i;
    int error_count = 0
/* *********************************************************
Exhaustive comparison between prior art steps 3, 4, 5 and the innovative step.
********************************************************* */
    for (i = -2048*256; i < 2048*256; i++) {
        // i is used as the input value
        /* ************************   */
        /* Compute prior art steps 3, 4, 5   */
        /* ************************   */
        // Step 3: divide by 16 with truncation toward zero
        if (i < 0) t = -i;
```

APPENDIX C-continued

EXHAUSTIVE VERIFICATION PROGRAM

```
    else t = i;
    t = t >> 4;
    if (i < 0) ref = -t;
    else ref = t;
    // Step 4: Oddification toward zero
    if ((ref > 0) && ((ref & 1) == 0))       ref--;
    else if ((ref < 0) && ((ref & 1) == 0))  ref++;
    //Step 5: Saturation
    ref = saturate(ref);            // This is the prior art result.
    /* ******************************  */
    /* Compute the innovative step and step 5  */
    /* ******************************  */
    // Innovative step: Combine divide and oddify
    innov = i;
    innov = innov + get_correction_factor(innov);
    innov = innov >> 4;
    //Step 5: Saturation
    innov = saturate(innov);
    /* **********************************************  */
    /* Compare the innovative step output to prior art output  */
    /* **********************************************  */
    if(innov != ref) {
        printf("** ERROR: input=%d, innovation=%d, reference=%d\n",
                I, innov, ref);
        error_count++;
    }
    /* **************************************************  */
    /* Print some values to show that the innovative step has the same  */
    /* as prior art techniques.                            */
    /* **************************************************  */
    printf(" INPUT    Invention     Prior Art Reference\n");
    printf(" -----    ---------     -------------------\n");
    if ((i > -128) & (i < 128)) {
        printf(" %3d    %3d       %3d\n", i, innov, ref);
    }
    if (error_count > 120) exit(1);
  }//end of for loop
  printf("DONE. Error_count = %d\n", error_count);
}//end of main
```

APPENDIX D

OUTPUT OF EXHAUSTIVE VERIFICATION PROGRAM OF APPENDIX C

| INPUT | INVENTION | PRIOR ART REFERENCE |
|---|---|---|
| −127 | −7 | −7 |
| −126 | −7 | −7 |
| −125 | −7 | −7 |
| −124 | −7 | −7 |
| −123 | −7 | −7 |
| −122 | −7 | −7 |
| −121 | −7 | −7 |
| −120 | −7 | −7 |
| −119 | −7 | −7 |
| −118 | −7 | −7 |
| −117 | −7 | −7 |
| −116 | −7 | −7 |
| −115 | −7 | −7 |
| −114 | −7 | −7 |
| −113 | −7 | −7 |
| −112 | −7 | −7 |
| −111 | −5 | −5 |
| −110 | −5 | −5 |
| −109 | −5 | −5 |
| −108 | −5 | −5 |
| −107 | −5 | −5 |
| −106 | −5 | −5 |
| −105 | −5 | −5 |
| −104 | −5 | −5 |
| −103 | −5 | −5 |
| −102 | −5 | −5 |

APPENDIX D-continued

OUTPUT OF EXHAUSTIVE VERIFICATION PROGRAM OF APPENDIX C

| INPUT | INVENTION | PRIOR ART REFERENCE |
|---|---|---|
| −101 | −5 | −5 |
| −100 | −5 | −5 |
| −99 | −5 | −5 |
| −98 | −5 | −5 |
| −97 | −5 | −5 |
| −96 | −5 | −5 |
| −95 | −5 | −5 |
| −94 | −5 | −5 |
| −93 | −5 | −5 |
| −92 | −5 | −5 |
| −91 | −5 | −5 |
| −90 | −5 | −5 |
| −89 | −5 | −5 |
| −88 | −5 | −5 |
| −87 | −5 | −5 |
| −86 | −5 | −5 |
| −85 | −5 | −5 |
| −84 | −5 | −5 |
| −83 | −5 | −5 |
| −82 | −5 | −5 |
| −81 | −5 | −5 |
| −80 | −5 | −5 |
| −79 | −3 | −3 |
| −78 | −3 | −3 |
| −77 | −3 | −3 |
| −76 | −3 | −3 |

APPENDIX D-continued

OUTPUT OF EXHAUSTIVE VERIFICATION PROGRAM OF APPENDIX C

| INPUT | INVENTION | PRIOR ART REFERENCE |
|---|---|---|
| −75 | −3 | −3 |
| −74 | −3 | −3 |
| −73 | −3 | −3 |
| −72 | −3 | −3 |
| −71 | −3 | −3 |
| −70 | −3 | −3 |
| −69 | −3 | −3 |
| −68 | −3 | −3 |
| −67 | −3 | −3 |
| −66 | −3 | −3 |
| −65 | −3 | −3 |
| −64 | −3 | −3 |
| −63 | −3 | −3 |
| −62 | −3 | −3 |
| −61 | −3 | −3 |
| −60 | −3 | −3 |
| −59 | −3 | −3 |
| −58 | −3 | −3 |
| −57 | −3 | −3 |
| −56 | −3 | −3 |
| −55 | −3 | −3 |
| −54 | −3 | −3 |
| −53 | −3 | −3 |
| −52 | −3 | −3 |
| −51 | −3 | −3 |
| −50 | −3 | −3 |
| −49 | −3 | −3 |
| −48 | −3 | −3 |
| −47 | −1 | −1 |
| −46 | −1 | −1 |
| −45 | −1 | −1 |
| −44 | −1 | −1 |
| −43 | −1 | −1 |
| −42 | −1 | −1 |
| −41 | −1 | −1 |
| −40 | −1 | −1 |
| −39 | −1 | −1 |
| −38 | −1 | −1 |
| −37 | −1 | −1 |
| −36 | −1 | −1 |
| −35 | −1 | −1 |
| −34 | −1 | −1 |
| −33 | −1 | −1 |
| −32 | −1 | −1 |
| −31 | −1 | −1 |
| −30 | −1 | −1 |
| −29 | −1 | −1 |
| −28 | −1 | −1 |
| −27 | −1 | −1 |
| −26 | −1 | −1 |
| −25 | −1 | −1 |
| −24 | −1 | −1 |
| −23 | −1 | −1 |
| −22 | −1 | −1 |
| −21 | −1 | −1 |
| −20 | −1 | −1 |
| −19 | −1 | −1 |
| −18 | −1 | −1 |
| −17 | −1 | −1 |
| −16 | −1 | −1 |
| −15 | 0 | 0 |
| −14 | 0 | 0 |
| −13 | 0 | 0 |
| −12 | 0 | 0 |
| −11 | 0 | 0 |
| −10 | 0 | 0 |
| −9 | 0 | 0 |
| −8 | 0 | 0 |
| −7 | 0 | 0 |
| −6 | 0 | 0 |
| −5 | 0 | 0 |
| −4 | 0 | 0 |
| −3 | 0 | 0 |
| −2 | 0 | 0 |
| −1 | 0 | 0 |
| 0 | 0 | 0 |
| 1 | 0 | 0 |
| 2 | 0 | 0 |
| 3 | 0 | 0 |
| 4 | 0 | 0 |
| 5 | 0 | 0 |
| 6 | 0 | 0 |
| 7 | 0 | 0 |
| 8 | 0 | 0 |
| 9 | 0 | 0 |
| 10 | 0 | 0 |
| 11 | 0 | 0 |
| 12 | 0 | 0 |
| 13 | 0 | 0 |
| 14 | 0 | 0 |
| 15 | 0 | 0 |
| 16 | 1 | 1 |
| 17 | 1 | 1 |
| 18 | 1 | 1 |
| 19 | 1 | 1 |
| 20 | 1 | 1 |
| 21 | 1 | 1 |
| 22 | 1 | 1 |
| 23 | 1 | 1 |
| 24 | 1 | 1 |
| 25 | 1 | 1 |
| 26 | 1 | 1 |
| 27 | 1 | 1 |
| 28 | 1 | 1 |
| 29 | 1 | 1 |
| 30 | 1 | 1 |
| 31 | 1 | 1 |
| 32 | 1 | 1 |
| 33 | 1 | 1 |
| 34 | 1 | 1 |
| 35 | 1 | 1 |
| 36 | 1 | 1 |
| 37 | 1 | 1 |
| 38 | 1 | 1 |
| 39 | 1 | 1 |
| 40 | 1 | 1 |
| 41 | 1 | 1 |
| 42 | 1 | 1 |
| 43 | 1 | 1 |
| 44 | 1 | 1 |
| 45 | 1 | 1 |
| 46 | 1 | 1 |
| 47 | 1 | 1 |
| 48 | 3 | 3 |
| 49 | 3 | 3 |
| 50 | 3 | 3 |
| 51 | 3 | 3 |
| 52 | 3 | 3 |
| 53 | 3 | 3 |
| 54 | 3 | 3 |
| 55 | 3 | 3 |
| 56 | 3 | 3 |
| 57 | 3 | 3 |
| 58 | 3 | 3 |
| 59 | 3 | 3 |
| 60 | 3 | 3 |
| 61 | 3 | 3 |
| 62 | 3 | 3 |
| 63 | 3 | 3 |
| 64 | 3 | 3 |
| 65 | 3 | 3 |
| 66 | 3 | 3 |
| 67 | 3 | 3 |
| 68 | 3 | 3 |
| 69 | 3 | 3 |
| 70 | 3 | 3 |
| 71 | 3 | 3 |
| 72 | 3 | 3 |

APPENDIX D-continued

OUTPUT OF EXHAUSTIVE VERIFICATION PROGRAM OF APPENDIX C

| INPUT | INVENTION | PRIOR ART REFERENCE |
|---|---|---|
| 73 | 3 | 3 |
| 74 | 3 | 3 |
| 75 | 3 | 3 |
| 76 | 3 | 3 |
| 77 | 3 | 3 |
| 78 | 3 | 3 |
| 79 | 3 | 3 |
| 80 | 5 | 5 |
| 81 | 5 | 5 |
| 82 | 5 | 5 |
| 83 | 5 | 5 |
| 84 | 5 | 5 |
| 85 | 5 | 5 |
| 86 | 5 | 5 |
| 87 | 5 | 5 |
| 88 | 5 | 5 |
| 89 | 5 | 5 |
| 90 | 5 | 5 |
| 91 | 5 | 5 |
| 92 | 5 | 5 |
| 93 | 5 | 5 |
| 94 | 5 | 5 |
| 95 | 5 | 5 |
| 96 | 5 | 5 |
| 97 | 5 | 5 |
| 98 | 5 | 5 |
| 99 | 5 | 5 |
| 101 | 5 | 5 |
| 102 | 5 | 5 |
| 103 | 5 | 5 |
| 104 | 5 | 5 |
| 105 | 5 | 5 |
| 106 | 5 | 5 |
| 107 | 5 | 5 |
| 108 | 5 | 5 |
| 109 | 5 | 5 |
| 110 | 5 | 5 |
| 111 | 5 | 5 |
| 112 | 7 | 7 |
| 113 | 7 | 7 |
| 114 | 7 | 7 |
| 115 | 7 | 7 |
| 116 | 7 | 7 |
| 117 | 7 | 7 |
| 118 | 7 | 7 |
| 119 | 7 | 7 |
| 120 | 7 | 7 |
| 121 | 7 | 7 |
| 122 | 7 | 7 |
| 123 | 7 | 7 |
| 124 | 7 | 7 |
| 125 | 7 | 7 |
| 126 | 7 | 7 |
| 127 | 7 | 7 |

DONE. Error_count = 0.

What is claimed is:

1. A method for performing discrete cosine transform coefficient reconstruction on a pixel coefficient of an encoded video data stream, said method comprising the steps of:

scaling said pixel coefficient by a scaling factor to produce a scaled coefficient value;

adding a sign value to said scaled coefficient value to produce a signed scaled coefficient value;

multiplying said signed scaled coefficient value by a quantizer scale factor and a quantization matrix factor to produce a coefficient product value;

based on said coefficient product value, generating a generic correction factor capable of providing any needed truncation and oddification;

adding said generic correction factor to said coefficient product value to produce a corrected coefficient value which includes any needed truncation and oddification;

dividing said corrected coefficient value by sixteen to produce a presaturation coefficient value; and imposing a bound on said presaturation coefficient value, wherein said step of generating said generic correction factor comprises the step of computing said generic correction factor according to the following conditions:

assigning to said generic correction factor a value of 0 if said coefficient product has a small negative value or zero value, otherwise;

assigning to said generic correction factor a value of 15 if said coefficient product has a small negative value or an odd negative value, otherwise;

assigning to said generic correction factor a value of −16 if said coefficient product has a positive even value, otherwise;

assigniny to said generic correction factor a value of 31 if said coefficient product has a negative even value, otherwise;

assigning to said generic correction factor a value of zero for all other values of said coefficient product.

2. The method as in claim 1, wherein said encoded video data stream is encoded according to MPEG-1 video standard.

3. The method as in claim 1, wherein said encoded video data stream is encoded according to MPEG-2 video standard.

4. The method as in claim 1, wherein said scaling factor has a value equal to two.

5. A video decoder apparatus to perform discrete cosine transform coefficient reconstruction on a pixel coefficient of an encoded video data stream, said video decoder apparatus comprising:

a prescaler apparatus to scale said pixel coefficient by a scaling factor to produce a scaled coefficient value, said prescaler apparatus generating a sign value and adding said sign value to said scaled coefficient value to produce a signed scaled coefficient value;

a multiplier apparatus coupled to said prescaler apparatus, said multiplier apparatus to multiply said signed scaled coefficient value by a quantizer scale factor and a quantization matrix factor to produce a coefficient product value;

a generic correction factor apparatus coupled to said multiplier apparatus, said correction factor apparatus comprising a generic correction factor generator to generate, based on said coefficient product value, a generic correction factor capable of providing any needed truncation and oddification;

an adder to add said generic correction factor to said coefficient product value to produce a sum value which includes any needed truncation and oddification;

a divider apparatus to divide said sum value by sixteen to produce said corrected coefficient value; and a saturation apparatus coupled to said correction factor apparatus, said saturation apparatus to impose a bound on said corrected coefficient value, wherein said generic correction factor generator computes said generic correction factor according to the following conditions;

said generic correction factor=0 if said coefficient product has a small negative value or zero value, otherwise;

said generic correction factor=15 if said coefficient product has a small negative value or an odd negative value, otherwise;

said generic correction factor=−16 if said coefficient product has a positive even value, otherwise;

said generic correction factor=31 if said coefficient product has a negative even value, otherwise;

said generic correction factor=0 for all other values of said coefficient product.

6. The apparatus of claim 5, wherein said encoded video data stream is encoded according to MPEG-1 video standard.

7. The apparatus of claim 5, wherein said encoded video data stream is encoded according to MPEG-2 video standard.

* * * * *